United States Patent [19]

Hoshi

[11] Patent Number: 4,815,070
[45] Date of Patent: Mar. 21, 1989

[54] NODE APPARATUS FOR COMMUNICATION NETWORK HAVING MULTI-CONJUNCTION ARCHITECTURE

[75] Inventor: Kazunori Hoshi, Yokohama, Japan

[73] Assignee: Ricoh Company, Ltd., Tokyo, Japan

[21] Appl. No.: 170,234

[22] Filed: Mar. 18, 1988

[30] Foreign Application Priority Data

Mar. 20, 1987 [JP] Japan ................... 62-64047

[51] Int. Cl.$^4$ .............................................. H04J 3/26
[52] U.S. Cl. ........................................ 370/60; 370/94
[58] Field of Search ............................ 370/94, 60, 58; 340/825.79, 825.83; 455/607; 178/3

[56] References Cited

U.S. PATENT DOCUMENTS

| | | | |
|---|---|---|---|
| 4,276,643 | 0/1981 | Laprie et al. | 371/8 |
| 4,380,063 | 4/1983 | Janson et al. | 370/60 |
| 4,393,381 | 7/1983 | Seiden | 340/825.83 |
| 4,399,531 | 8/1983 | Grande et al. | 370/60 |
| 4,443,875 | 4/1984 | Blausten | 370/94 |
| 4,482,996 | 11/1984 | Wilson et al. | 370/60 |
| 4,602,364 | 7/1986 | Herman et al. | 370/60 |

Primary Examiner—Douglas W. Olms
Assistant Examiner—Min Jung Kim
Attorney, Agent, or Firm—Oblon, Fisher, Spivak, McClelland & Maier

[57] ABSTRACT

A node apparatus is used in a communication network having a multi-conjunction architecture. The communication network has a plurality of transmission paths each coupling one node apparatus to another node apparatus or a terminal device. The node apparatus generally comprises an input port, an output port, and a control part for controlling the coupling of input channels of the input port to output channels of the output port. The control part disconnects and releases a fixed communication path when no signal is present at the input and output channels of the input and output ports for a first time period after the communication path is fixed, and initializes the node apparatus when no signal is present at the input and output channels of the input and output ports for a second time period before the communication path is fixed. In the initial state, each input channel other than input channels included in the fixed communication path is coupled to all of the output channels other than an output channel having a corresponding channel number.

9 Claims, 13 Drawing Sheets

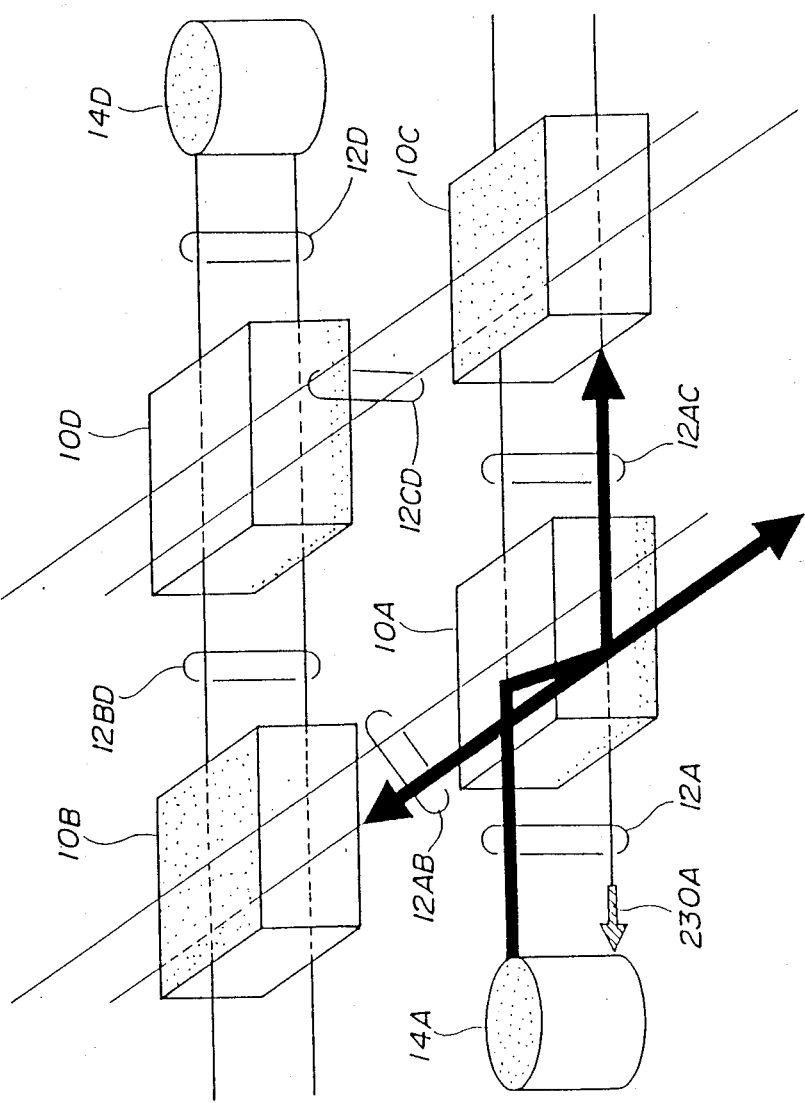

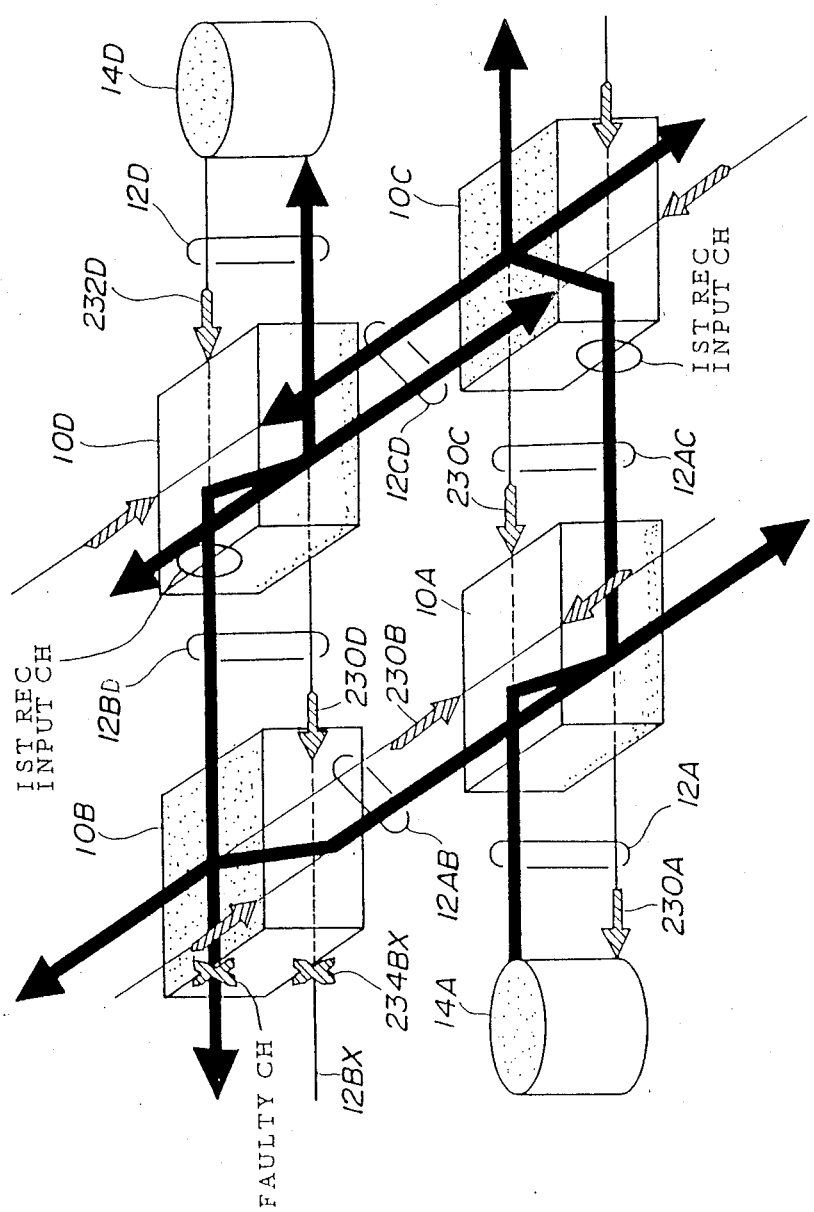

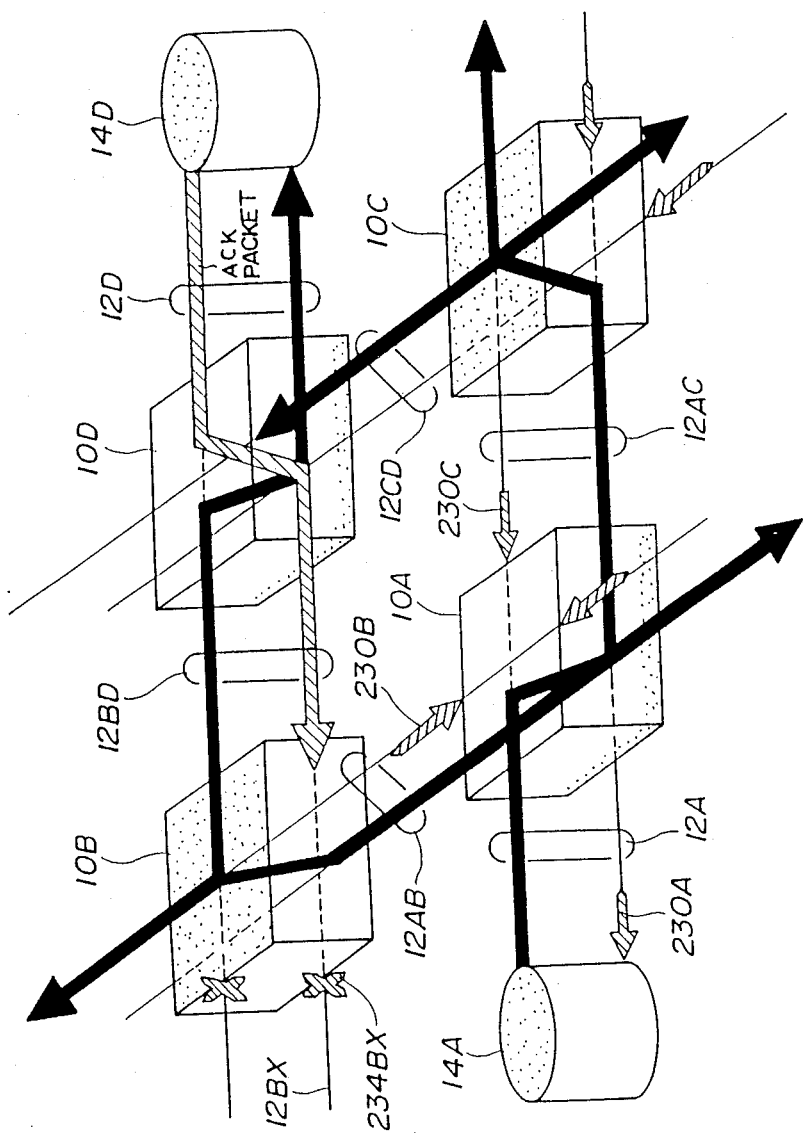

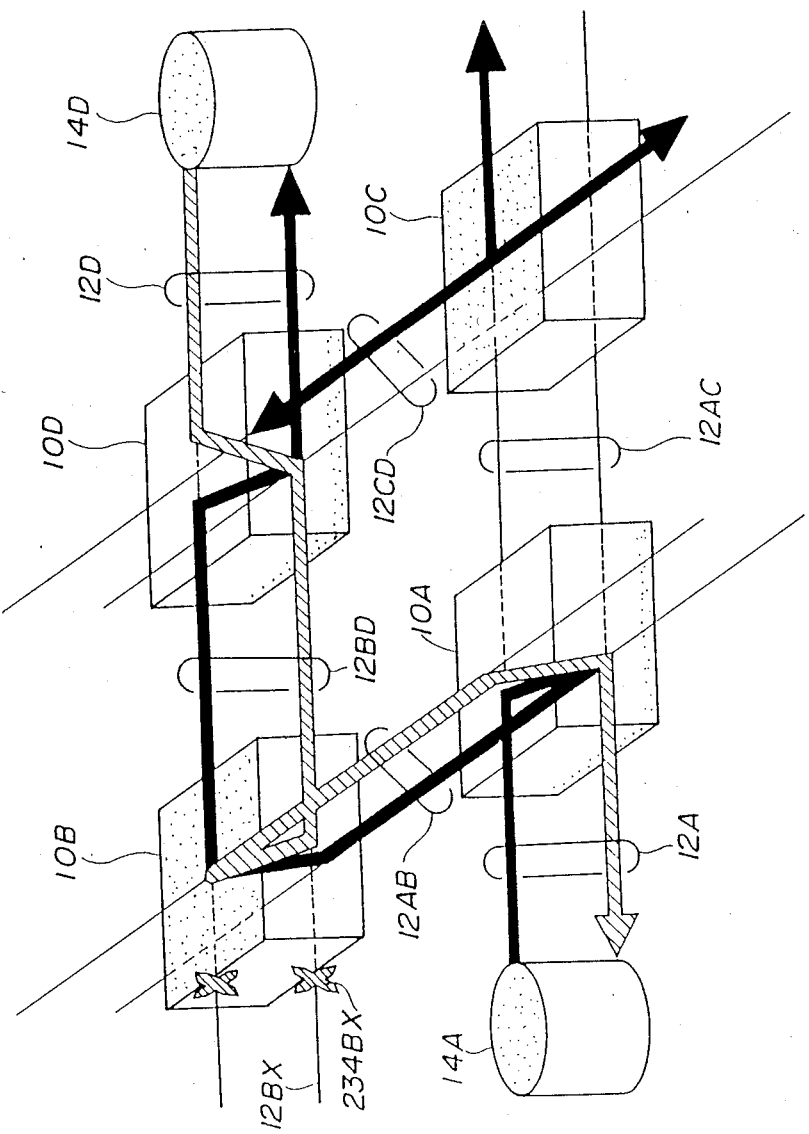

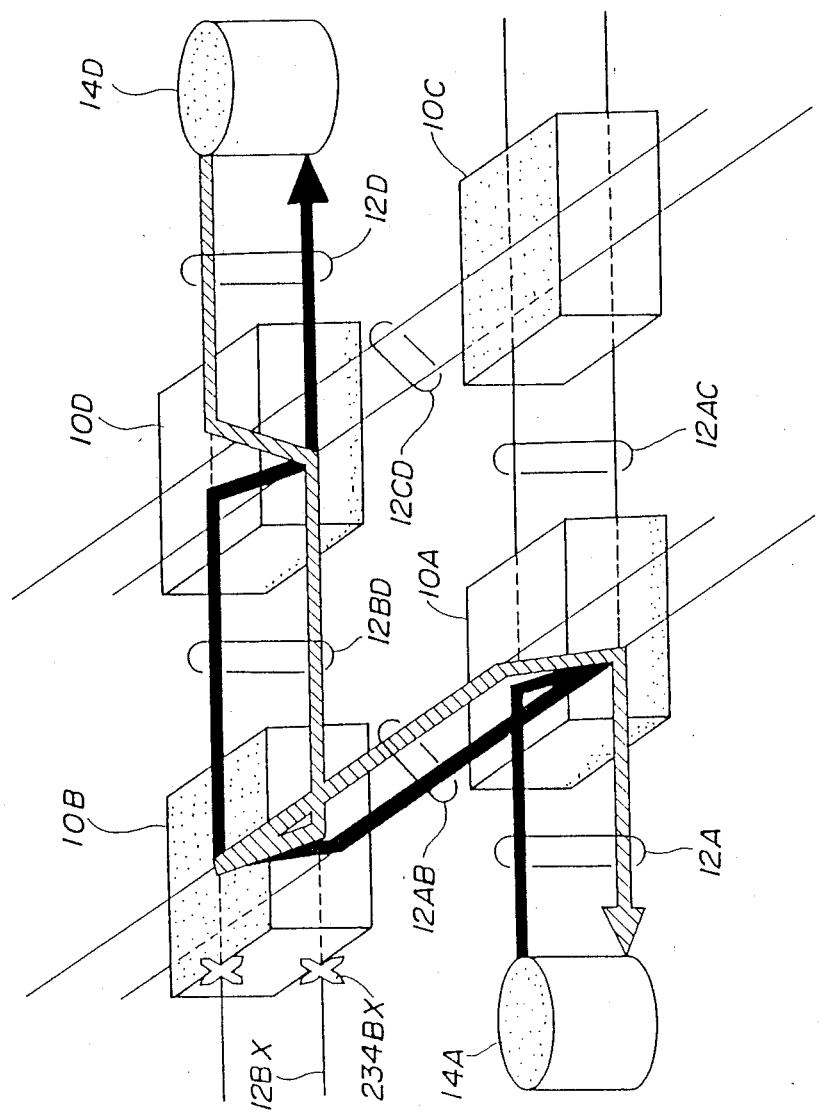

NODE APPARATUS FOR COMMUNICATION NETWORK HAVING MULTI-CONJUNCTION ARCHITECTURE

BACKGROUND OF THE INVENTION

The present invention generally relates to node apparatuses, and more particularly to a node apparatus of a communication network employing a multi-conjunction architecture.

A multi-channel lattice communication network applicable to local area networks (LANs), public line networks and especially to a multi-media communication was previously proposed in a U.S. patent application Ser. No. 096,532 filed Sept. 15, 1987 in which the assignee is the same as the assignee of the present application. The proposed lattice communication network is analogous to nerve cells of a living body, and employs node apparatuses. Each node apparatus has a plurality of input and output channels and is used as a communication controleelement. Such node apparatuses are coupled in a multi-conjunction to constitute the lattice communication network. Each node apparatus transfers one of incoming digital signals according to a first-come-first-served logic (hereinafter simply referred to as a first-come-first-output logic).

The proposed lattice communication network has a large degree of freedom of network topology because of the multi-conjunction architecture. Thus, the survivability of data is high. In other words, even when a fault occurs in a path of the communication network, it is possible to carry out the communication through other paths. Furthermore, it is possible to select optimum paths for the communication because each node apparatus transfers the incoming digital signals according to the first-come-first-output logic.

On the other hand, the proposed lattice communication network employs a multi-channel system in which a plurality of connecting channels are established, so as to effectively achieve a full duplex communication. The proposed lattice communication network is effectively applicable to the physical layer to the network layer of the open system interconnection (OSI), for example.

When making a communication in the proposed lattice communication network, a node apparatus which receives a signal broadcasts the signal to other node apparatuses or terminal devices and waits for an acknowledge signal or returning signal sent back from a destination terminal device. A communication path is fixed when the acknowledge signal is received from the destination terminal device, and the node apparatus which receives the acknowledge signal enters an end sequence. The node apparatus is initialized and is ready to receive and broadcast a new signal after the end sequence is ended.

When a new communication path is fixed in the proposed lattice communication network, a node apparatus in the fixed communication path immediately enters the end sequence. However, other node apparatuses not included in the fixed communication path continue to carry out a time-out operation for detecting an end of the signal, that is, an end of the communication, and enter the end sequence only after the time-out operation is ended. In other words, a node apparatus not included in the fixed communication path confirms that no signal is received for a predetermined time before entering the end sequence.

In the proposed lattice communication network, the predetermined time is set longer than a time it takes for the node apparatus in the fixed communication path to be initialized so as to get ready to receive and broadcast a new signal. In other words, even when the node apparatus in the fixed communication path is already initialized through the end sequence and is ready for the new communication, the node apparatus not included in the fixed communication path is not yet initialized and it takes a certain time before the node apparatus not included in the fixed communication path is finally initialized.

As a result, when the new communication is started in a state where the node apparatus in the fixed oommunication path is already initialized but the node apparatus not included in the fixed communication path is not yet initialized, the node apparatus not included in the fixed communication path cannot carry out a normal reception and broadcasting of the new signal because it is not yet initialized. Such a problem will not occur if the new communication were to start after it is certain that the node apparatus not included in the fixed communication path is initialized, however, a terminal device which starts the new communication has no means of detecting whether or not a node apparatus in the lattice communication network is initialized.

SUMMARY OF THE INVENTION

Accordingly, it is a general object of the present invention to provide a novel and useful node apparatus in which the problems described heretofore are eliminated.

Another and more specific object of the present invention is to provide a node apparatus for a communication network having a multi-conjunction architecture, where the communication network has a plurality of transmission paths each coupling one node apparatus to another node apparatus or a terminal device. The node apparatus comprises an input port comprising a plurality of input channels connected to the transmission paths, an output port comprising a plurality of output channels connected to the transmission paths, a switching gate part for coupling the input and output channels of the input and output ports, and a control part comprising first and second control circuits for controlling the switching gate part to selectively couple the input and output channels, where the first control circuit is coupled to the input port and detects a first receiving input channel which receives a sending signal first out of the input channels and the second control circuit is coupled to the input and output ports and controls the switching gate part based on a time supervision of a signal presence at the input and output channels of the input and output ports. The first control circuit controls the switching gate part responsive to the detection of the first receiving input channel so that all of the input channels other than the first receiving input channel are disconnected from the output channels, thereby transferring the sending signal received by the first receiving input channel to all of the output channels other than an output channel having a channel number corresponding to that of the first receiving input channel. In addition, the first control circuit detects a predetermined input channel which receives a returning signal out of the input channels other than the first receiving input channel, and the first control circuit controls the switching gate part responsive to the detection of the predetermined input channel so that the predetermined input channel is connected to the output channel having a channel number corresponding to that of the first receiving input channel and the first receiving input channel is connected to an output channel having a channel number corresponding to that of the predetermined input channel, thereby fixing a communication path between the input and output ports. On the other hand, the second control circuit controls the switching gate part to disconnect and release the fixed communication path when no signal is present at the input and output channels of the input and output ports for a first time period after the communication path is fixed, and controls the switching gate part to set the node apparatus to an initial state when no signal is present at the input and output channels of the input and output ports for a second time period before the communication path is fixed. In the initial state, each input channel other than input channels included in the fixed communication path is coupled to all of the output channels other than an output channel having a corresponding channel number.

According to the node apparatus of the present invention, the fixed communication path is disconnected and released when no signal is present at the input and output channels of the input and output ports for the first time period after the communication path is fixed, and the node apparatus is set to the initial state when no signal is present at the input and output channels of the input and output ports for the second time period before the communication path is fixed. Therefore, it is possible to shorten the time it takes to initialize all of the node apparatuses in the communication network, and a possibility of a new communication being started in a state where a certain node apparatus in the communication network is not yet initialized is effectively reduced to prevent an erroneous operation of the certain node apparatus in the communication network.

Other objects and further features of the present invention will be apparent from the following detailed description when read in conjunction with the accompanying drawings.

BRIEF DESCRIPTION OF THE DRAWINGS

FIGS. 7A through 7E are diagrams for explaining the sequence of the communication made in the lattice communication network using four node apparatus of the present invention;

DETAILED DESCRIPTION

Figure 1:
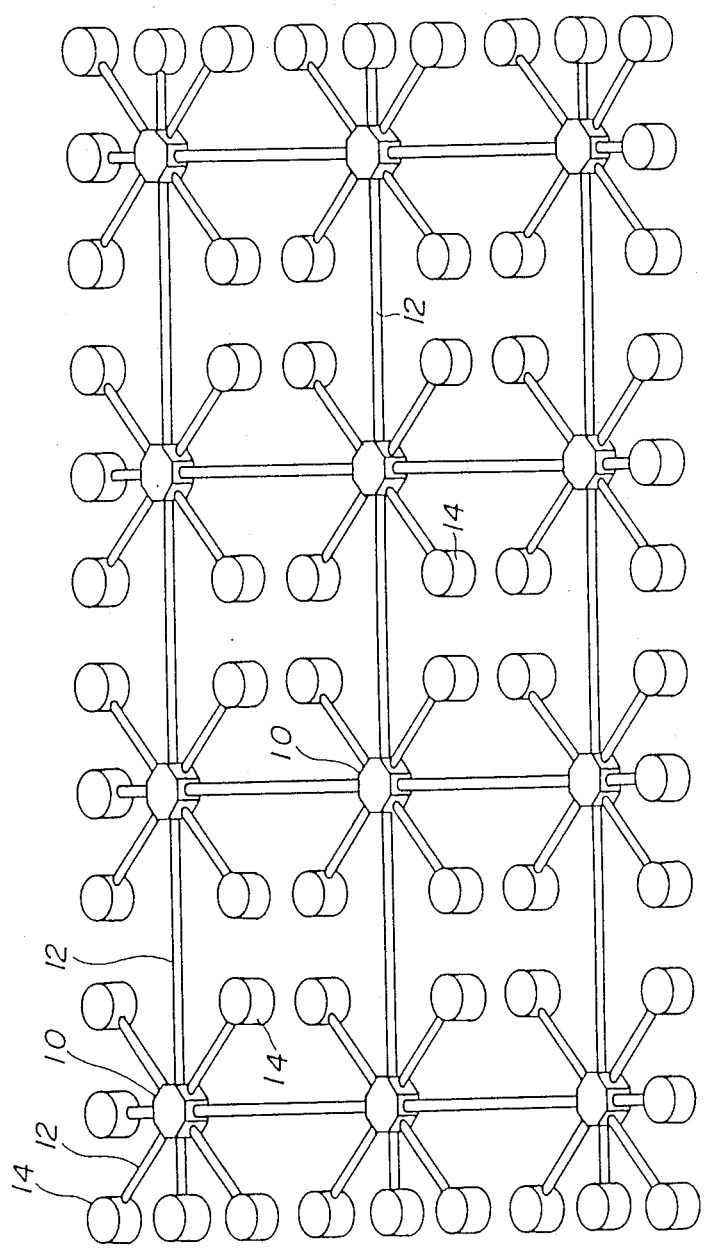
FIG. 1 shows a communication network employing the multi-conjunction architecture to which the node apparatuses according to the present invention may be applied.

First, a description will be given on a communication network employing the multi-conjunction architecture to which the node apparatus according to the present invention may be applied, by referring to FIG. 1. In FIG. 1, each node apparatus 10 is coupled to other node apparatuses 10 and/or terminal devices 14 through a transmission path 12 in two or three dimensions to constitute a lattice communication network. The communication network employing the multi-conjunction architecture may be a linear communication network or a loop shaped communication network.

There is no limit to the number of input and output channels of the node apparatus 10. Hence, there is no limit to the number of node apparatuses 10 and/or terminal devices 14 which may be coupled to the node apparatus 10 through the transmission path 12, provided that the number is within the capacity of input and output ports of the node apparatus 10. It is possible to constitute the entire communication network by a single node apparatus 10. In addition, it is possible to provide a plurality of node apparatuses 10 on a single printed wiring board and treat the wiring board as a single node apparatus, so as to essentially increase the capacity of the input and output ports.

The terminal device 14 can receive and transmit data asynchronously. For example, the terminal device 14 is a processing system such as a personal computer, a service station such as a filing station and a print station, and the like. It is desirable although not essential, that the data is transmitted in the form of message packets. As will be described later, it is desirable although not essential, that the terminal device 14 is designed for the full duplex communication and sends out a returning signal immediately after receipt of a sending signal (message packet) intended for the terminal device 14.

For example, the transmission path 12 is an optical transmission path constituted by optic fibers or an electrical transmission path constituted by twisted pair wire, coaxial cable and the like. In the present embodiment, the data is transmitted in analog or digital form, and the full duplex communication is carried out in the communication network. The transmission path 12 between the node apparatus 10 and the terminal device 14 may be designed for the half duplex communication. It is possible to provide a plurality of transmission paths 12 between the node apparatuses 10 depending on the traffic.

Figure 2:
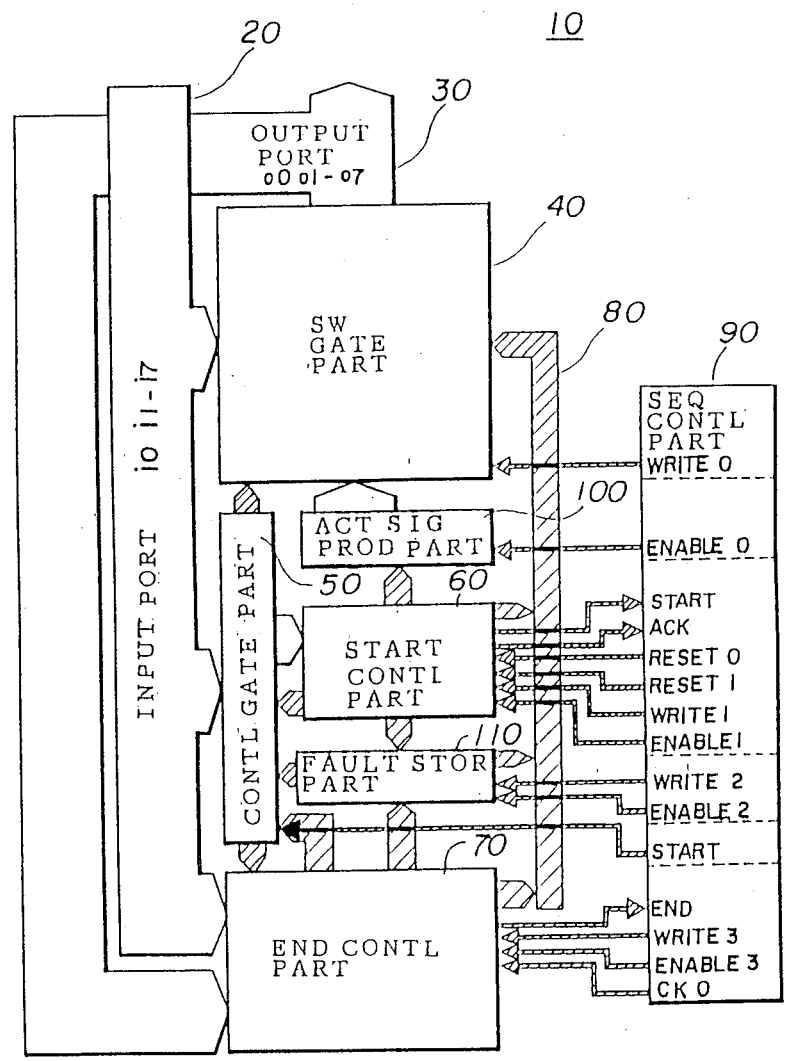
FIG. 2 is a system block diagram showing an embodiment of the node apparatus according to the present invention.

FIG. 2 shows an embodiment of the node apparatus 10 according to the present invention. The node apparatus 10 generally comprises an input port 20, an output port 30, a switching gate part 40, a control gate part 50, a start control part 60, an end control part 70, a gate setting bus 80, a sequence control part 90, an active signal producing part 100 and a fault storage part 110.

The input port 20 is connected to receiving lines of the transmission path 12, while the output port 30 is connected to sending lines of the transmission path 12.

The input port 20 is coupled to the output port 30 through the switching gate part 40. In the present embodiment, the input port 20 comprises eight receiving or input channels i0 through i7, and the output port 30 comprises eight sending or output channels o0 through o7. Hence, in the present embodiment, it is possible to connect up to eight node apparatuses 10 and/or terminal devices 14 to one node apparatus 10 through the transmission path 12. A pair of input channel and output channel having a corresponding channel number is coupled to another node apparatus 10 (or terminal device 14).

The switching gate part 40 selectively couples an arbitrary one of the input channels i0 through i7 to arbitrary ones of the output channels o0 through o7. The input port 20 is coupled to the start control part 60 and the end detecting part 70 through the control gate part 50. The control gate part 50 controls the supply of signals from the input port 20 to the start control part 60 and the supply of control signals from the start control part 60, the fault storage part 110 and the end control part 70 to the appropriate one of the switching gate part 40, the start control part 60 and the end control part 70.

The start control part 60 detects whether or not an input signal is received by the input port 20 and discriminates a first receiving input channel which receives the input signal first. The end control part 70 detects an end of the input signal received by the input channel connected to a set communication path, and carries out a communication ending process. The switching gate part 40, the start control part 60 and the end control part 70 are coupled to each other through the gate setting bus 80.

The active signal producing part 100 for producing an active signal is coupled to the switching gate part 40 and the start control part 60. The fault storage part 110 for storing data on a faulty or dormant input channel is coupled to the start control part 60, the end control part 70 and the gate setting bus 80.

The switching gate part 40, the control gate part 50, the start control part 60, the end control part 70, the active signal producing part 100 and the fault storage part 110 are respectively controlled by the sequence control part 90.

Figure 3:
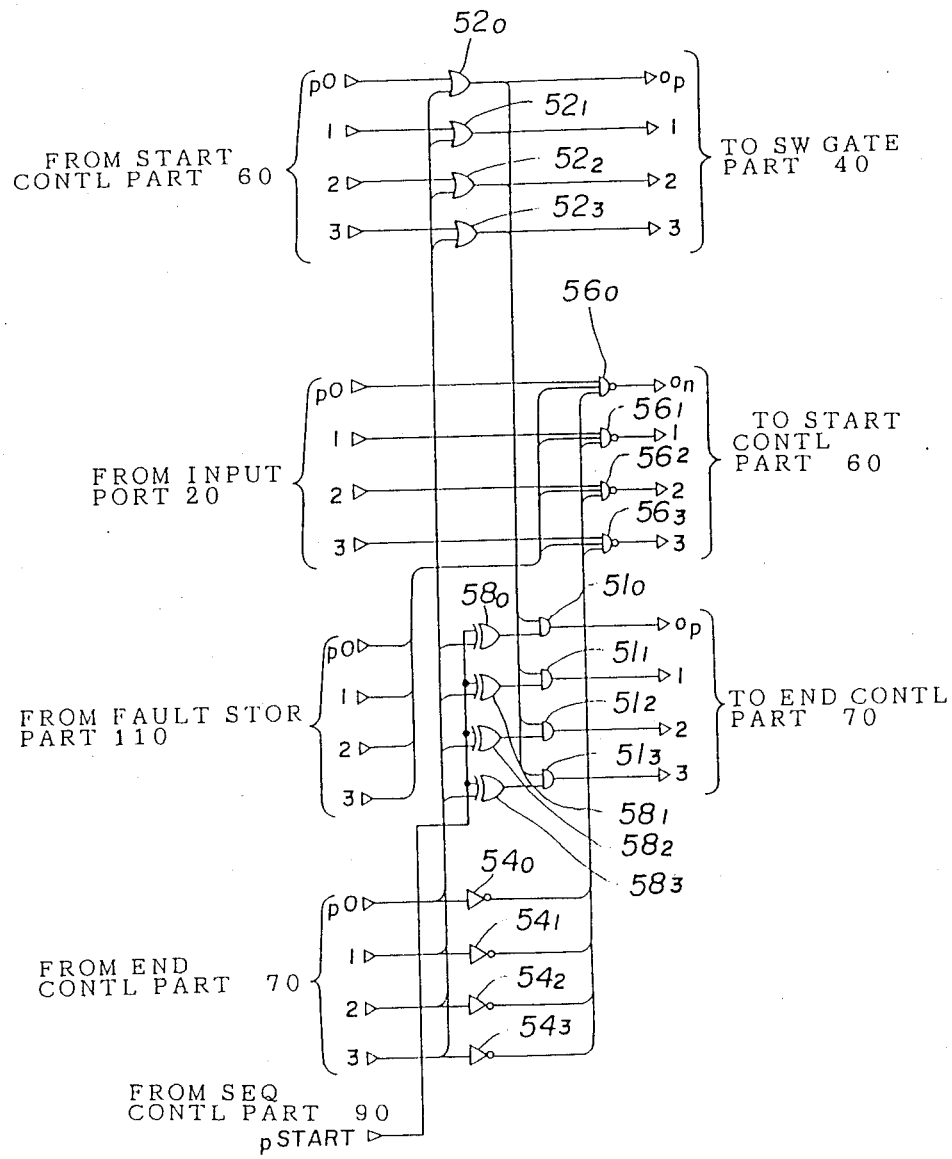
FIG. 3 is a circuit diagram showing an embodiment of a control gate part of the node apparatus shown FIG. 2.

FIG. 3 shows an embodiment of the control gate part 50 for four input and output channels. The control gate part 50 comprises four 2-input AND gates $51_0$ through $51_3$, four 2-input OR gates $52_0$ through $52_3$, four inverters $54_0$ through $54_3$, four 3-input NAND gates $56_0$ through $56_3$, and four exclusive-OR gates $58_0$ through $58_3$ which are connected as shown. Each of the OR gates $52_0$ through $52_3$ obtain a logical sum of signals from a corresponding channel of the start control part 60 and the end control part 70, and supply the logical sum to the switching gate part 40. Corresponding ones of the inverters $54_0$ through $54_3$ and the NAND gates $56_0$ through $56_3$ obtain a logical product of signals from a corresponding channel of the input port 20 and the fault storage part 110, and supply the logical product to the start control part 60. A start signal START from a terminal START of the sequence control part 90 is supplied to each of the exclusive-OR gates $58_0$ through $58_3$. Corresponding ones of the exclusive-OR gates $58_0$ through $58_3$ and the AND gates $51_0$ through $51_3$ selectively supply to the end control part 70 a signal from a corresponding channel of the end control part 70 when detecting the end of the communication in the fixed communication path and supply to the end control part 70 a signal from a corresponding channel of the start control part 60 when detecting an interruption in the sending signal which is received by the first receiving input channel.

The active signal producing part 100 produces an active signal indicating that the node apparatus 10 is operating normally and is active. The active signal has no restrictions except for the signal length thereof. The signal length of the active signal is set to a value which is longer than a minimum time required to operate flip-flops of the start control part 60 and terminates within the length of an active detection time constant.

Figure 4:
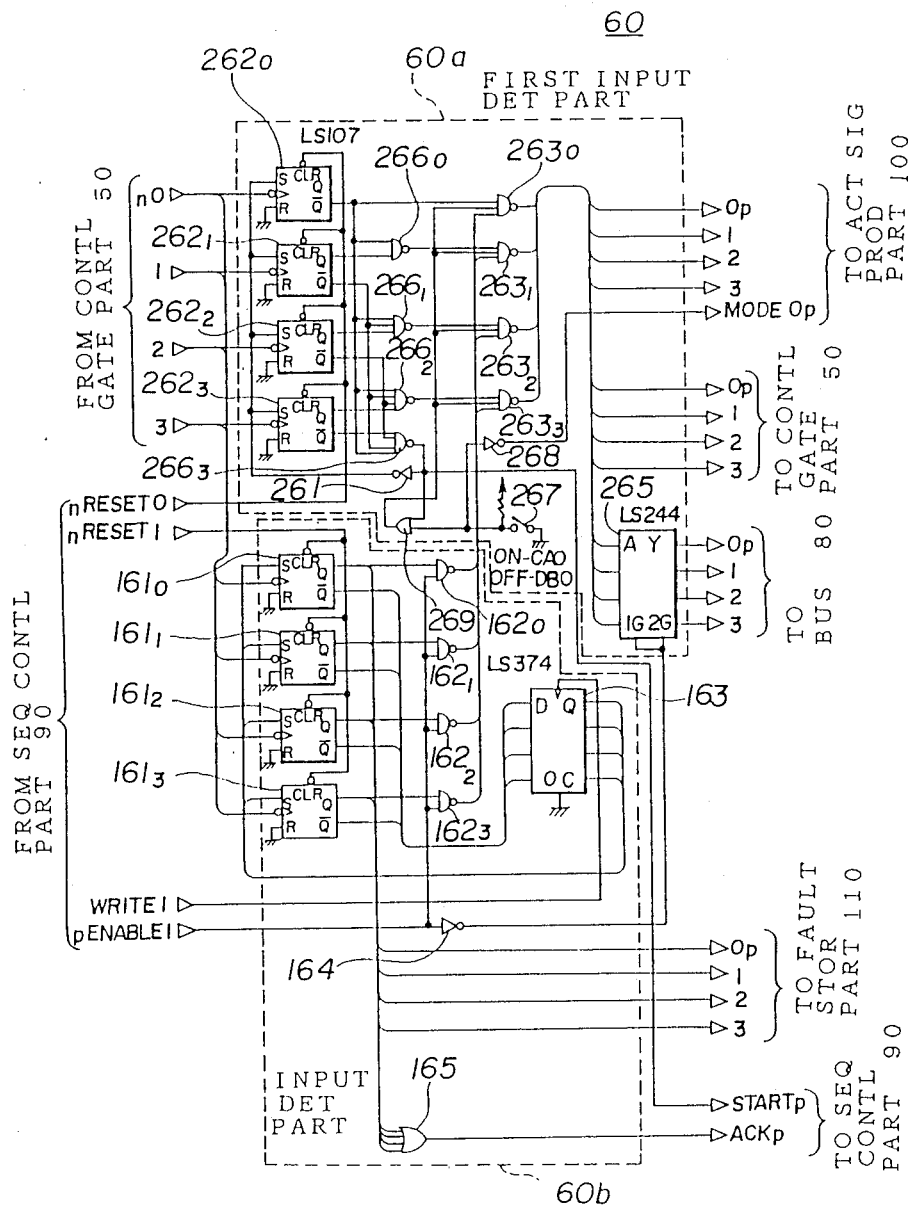
FIG. 4 a circuit diagram showing an embodiment of a start control part of the node apparatus shown in FIG. 2.

FIG. 4 shows an embodiment of the start control part 60 for four input and output channels. The start control part 60 generally comprises a first input signal detecting part 60a and an input signal detecting part 60b. The first input signal detecting part 60a detects the input signals from the input channels i0 through i3 and discriminates which input signal is received first, that is, which input channel receives the input signal first, according to the first-come-first-output logic. The first input signal detecting part 60a comprises inverters 261 and 268, four SR flip-flops $262_0$ through $262_3$, four 3-input NAND gates $263_0$ through $263_3$, a bus buffer 265, four NAND gates $266_0$ through $266_3$, a mode changing switch 267 and an OR gate 269 which are connected as shown. The input signals from the input channels i0 through i3 are obtained through the control gate part 50 and are supplied to clock terminals of the flip-flops $262_0$ through $262_3$.

A signal from a terminal RESET0 of the sequence control part 90 is supplied to clear terminals CLR of the flip-flops $262_0$ through $262_3$. The flip-flops $262_0$ through $262_3$ constitute a circuit for holding the states of the input signals from the input channels. The 2-input NAND gate $266_0$, the 3-input NAND gate $266_1$ and the 4-input NAND gate $266_2$ constitute a circuit for assigning priorities to output signals of the flip-flops $262_0$ through $262_3$. The 4-input NAND gate $266_3$ and the inverter 261 constitute a circuit for holding the states of the flip-flops 262 through $262_3$ by supplying a low-level signal to set terminals S of all of the flip-flops $262_0$ through $262_3$ responsive to the input signal supplied to one of the flip-flops $262_0$ through $262_3$ The circuit constituted by the 4-input NAND gate $266_3$ and the inverter 261 also has the function of reporting to the sequence control part 90 that a first sending signal is received.

The mode changing switch 267 is used to change the mode of the transmission between a control after output (CAO) mode and a detect before output (DBO) mode, and the mode changing switch 267 is constantly closed in the present embodiment to select the CAO mode. The OR circuit 269 obtains a logical sum of an output signal of the mode changing switch 267 and the output signal of the NAND gate $266_3$, and supplies the logical sum to each of the NAND gates $263_0$ through $263_3$. The output signal of the NAND gate $266_3$ is also supplied to the terminal START of the sequence control part 90. The NAND gates $263_0$ through $263_3$ are also supplied with signals of corresponding channels of the input signal detecting part 60b. Furthermore, the NAND gates $263_0$ through $263_3$ are respectively supplied with the $\overline{Q}$-output of the flip-flop $262_0$ and the outputs of the NAND gates $266_0$ through $266_2$. The outputs of the NAND gates $263_0$ through $263_3$ are supplied to the active signal producing part 100 and the control gate part 50, and also to the gate setting bus 80 through the bus buffer 265.

The input signal detecting part 60$b$ detects whether or not an input signal is received by the input port 20. The input signal detecting part 60$b$ ncomprises four SR flip-flops $161_0$ through $161_3$, four 2-input NAND gates $162_0$ through $162_3$, a flip-flop 163, an inverter 164 and a 4-input OR gate 165 which are connected as shown. The input signals from the input channels i0 through i3 are obtained through the control gate part 50 and are supplied to clock terminals of the flip-flops $161_0$ through $161_3$.

A signal from a terminal RESET1 of the sequence control part 90 is supplied to clear terminals CLR of the flip-flops $161_0$ through $161_3$. The flip-flops $161_0$ through $161_3$ constitute a circuit for holding the states of the input signals from the input channels. The flip-flop 163 stores the output states of the flip-flops $161_0$ through $161_3$, and supplies a low-level signal to the set terminals S of the flip-flops $161_0$ through $161_3$ to fix the states thereof. The NAND gates $162_0$ through $162_3$ constitute a gate circuit for controlling the connection of the outputs of the flip-flops $161_0$ through $161_3$ to the first input detecting part 60$a$. Each of the NAND gates $162_0$ through $162_3$ receive a signal from a terminal ENABLE1 of the sequence control part 90 and the Q-output of the corresponding one of the flip-flops $161_0$ through $161_3$ This signal from the terminal ENABLE1 is inverted in the inverter 164 and supplied to the bus buffer 265 of the first input signal detecting part 60$a$. The OR gate 165 obtains a logical sum of the Q-outputs of the flip-flops $161_0$ through $161_3$, and supplies to a terminalACK of the sequence control part 90 the logical sum indicative of whether or not the first sending signal is received. The Q-outputs of the flip-flops $161_0$ through $161_3$ are also supplied to the fault storage part 110. A signal from a terminal WRITE1 of the sequence control part 90 is supplied to a clock terminal of the flip-flop 163.

The storage part 110 is used to store one or more faulty or dormant input channels.

Figure 5:
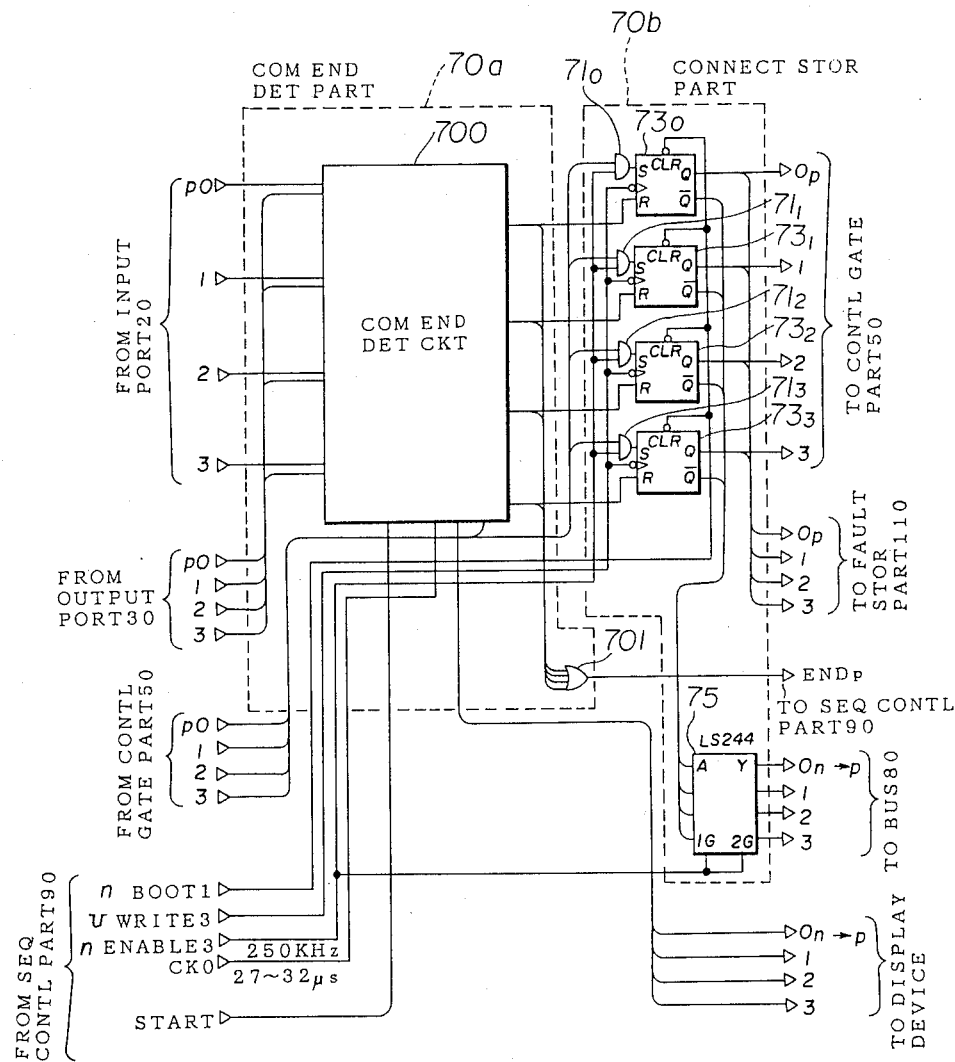
FIG. 5 is a circuit diagram showing an end control part of the node apparatus shown in FIG. 2.

FIG. 5 shows an embodiment of the end control part 70 for four input and output channels. The end control part 70 generally comprises a communication end detecting part 70$a$ and a connection storage part 70$b$. The communication end detecting part 70$a$ comprises a communication end detecting circuit 700 and an OR gate 701. The communication end detecting circuit 700 supervises the states of the input port 20 and the output port 30 so as to detect an end of the communication.

Figure 6:
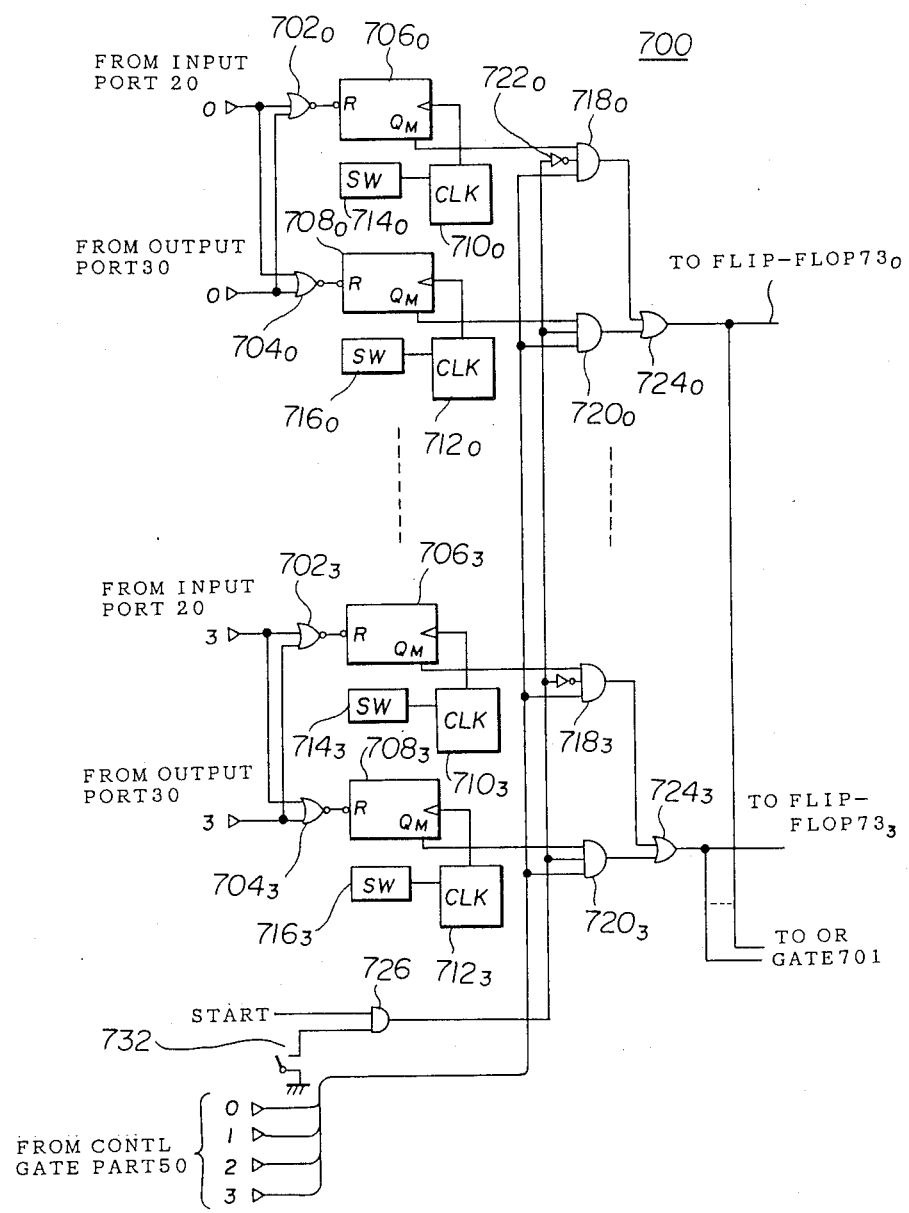
FIG. 6 is a circuit diagram showing an embodiment of a communication end detecting circuit of the end control shown in FIG. 5.

FIG. 6 shows an embodiment of the communication end detecting circuit 700. The communication end detecting circuit 700 comprises with respect to each channel two NOR gates $702_i$ and $704_i$, two shift registers $706_i$ and $708_i$, two clock pulse generators $710_i$ and $712_i$, two adjusting switches $714_i$ and $716_i$, two AND gates $718_i$ and $720_i$,an inverter $722_i$ and an OR gate $724_i$,where i=1 to 3 in the present embodiment, an AND gate 726 and a switch 732 which are connected as shown. The NOR gates $702_i$ and $704_i$ each obtain a logical sum of the signal from a corresponding channel of the input port 20 and the signal from a corresponding channel of the output port 30. The shift registers $706_i$ and $708_i$ each detect an end of the communication based on a time determined by a communication end detection time constant which will be described later. The AND gate $718_i$ obtains a logical product of an output of the shift register $706_i$, an output from a corresponding channel of the control gate part 50 and an inverted output of the AND gate 726. On the other hand, the AND gate $720_i$ obtains a logical product of an output of the shift register $708_i$, an output from a corresponding channel of the control gate part 50 and an output of the AND gate 726.

The 4-input OR gate 701 shown in FIG. 5 obtains a logical sum of outputs of the OR gates $634_0$ through $634_3$, and informs the sequence control part 90 that a communication is ended in a fixed communication path or that the first sending signal from the first receiving input channel is interrupted. The control gate part 50 described before determines whether the OR gate 701 is to inform the end of the communication or the signal interruption. Hence, the end control part 70 detects the end of the communication when no signal is received at the two input channels in the fixed communication path.

An end sequence is a process in which a fixed communication path in the communication network is released by initializing the node apparatuses in the fixed communication path, so as to permit another communication to be made in the communication network. Specifically, the shift registers $706_i$ and $708_i$ of the communication end detecting circuit 700 supervise whether or not input and output signals exist during a predetermined time period. A supervision time in which the supervision is made is set to one of two kinds, one being for use in a communication after a communication path is fixed and the other being for use in fixing a communication path. In other words, two shift registers $706_i$ and $708_i$ are provided with respect to each channel i, and two time-out circuits are constituted by counting output clock pulse signals of the corresponding clock pulse generators $610_i$ and $612_i$.

For example, the shift register $708_i$, the clock pulse generator $712_i$ and the adjusting switch $716_i$ constitute a time-out circuit for determining a communication supervision time for use in fixing the communication path, that is, a second communication end detection time constant. On the other hand, the shift register $706_i$, the clock pulse generator $710_i$ and the adjusting switch 714 constitute a time-out circuit for determining a communication supervision time for use after the communication path is fixed, that is, a first communication end detection time constant. The frequencies of the the clock pulse signals generated from the clock pulse generators $710_i$ and $712_i$ are adjustable in the respective adjusting switches $714_i$ and $716_i$. Accordingly, time constants of the shift registers $706_i$ and $708_i$ can be set to desired values for each channel i.

In a system such as the OMNINET, for example, there is a time period (no-signal state) in the order of ten-odd milliseconds or more in which no signal exists after an acknowledge or not acknowledge signal is sent in response to a message. Hence, the first communication end detection time constant is set to such a length that the communication path will not be released during the time period in which no signal exists. However, because the no-signal state will not occur until the message is sent and the acknowledge or not acknowledge signal is sent back in response thereto, the second communication end detection time constant is set to ten-odd microseconds at the maximum. In other words, the second communication end detection time constant may be set to a time shorter than the first communication end detection time constant.

The start signal START from the sequence control part 90 may be supplied directly to one input terminal of the AND gate $726_i$ or indirectly through the control gate part 50. The other input terminal of the AND gate 726$_i$ is grounded through the switch 732. The switch 732 is open when the two kinds of time-out circuits are used, and the switch 732 is closed when the same time-out circuit is used before and after the fixing of the communication path. When the switch 732 is closed, it is possible to use only the time-out circuit including the shift register 706$_i$.

The end of the communication is detected when no signal exists and a predetermined logic state of the signal continues for a time determined by the communication end detection time constant. The first communication end detection time constant is set to a time which is essentially equal to a sum of a propagation delay time for a return trip covering the maximum tolerable distance between the node apparatus 10 and another node apparatus 10 or the terminal device 14, a time it takes for the terminal device 14 to start sending a returning (or sending) signal after the receipt of a sending (or returning) signal ends, and a time it takes to detect a true end of the communication from an information content made up of successive "0"s or "1"s. On the other hand, the second communication end detection time constant is set to a time which is essentially equal to a sum of a propagation delay time for a return trip covering the maximum tolerable distance between the node apparatus 10 and another node apparatus 10 or the terminal device 14, a time it takes for the terminal device 14 to start sending a first returning signal after the receipt of a first sending signal ends, and a time it takes to detect a true end of the communication from an information content made up of successive "0"s or "1"s. Normally, a slight margin time is added to the length of the first and second communication end detection time constant.

Next, a description will be given on the operation of the communication end detecting circuit 700. The level of the start signal START becomes high when the node apparatus 10 enters a start sequence with respect to a certain channel. When the switch 732 is open, the output signal level of the AND gate 718$_i$ becomes low and the output signal level of the AND gate 720$_i$ becomes high responsive to the change in the signal level of the start signal START to the high level. In other words, the output signal level of either one of the AND gates 718$_i$ and 720$_i$ becomes low depending on whether or not the start signal START has a high level. Thus, the high-level start signal START switches over the time supervision by the shift register 706$_i$ to the time supervision by the shift register 708$_i$. When the output signal level of the other of the AND gates 718$_i$ and 720$_i$ becomes high, the high-level signal is supplied to the sequence control part 90 as an end signal END through the OR gate 724$_i$ and the OR gate 701. Accordingly, the sequence control part 90 controls the node apparatus 10 to the end sequence responsive to the end signal END, and the communication network is set to a state ready for a new communication.

Returning now to the description of FIG. 5, the connection storage part 70b comprises four 2-input AND gates 71$_0$ through 71$_3$, four SR flip-flops 73$_0$ through 73$_3$, and a bus buffer 75 which are connected as shown. Each of the AND gates 71$_0$ through 71$_3$ receive a signal from a terminal ENABLE3 of the sequence control part 90 and a signal of the corresponding channel from the control gate part 50. The outputs of the AND gates 71$_0$ through 71$_3$ are supplied to set terminals S of the corresponding flip-flops 73$_0$ through 73$_3$, and the outputs of the OR gates 724$_0$ through 724$_3$ within the communication end detecting circuit 700 of the communication end detecting part 70a are supplied to reset terminals R of the corresponding flip-flops 73$_0$ through 73$_3$. In addition, a signal from a terminal WRITE3 of the sequence control part 90 is supplied to clock terminals of the flip-flops 73$_0$ through 73$_3$. The Q-outputs of the flip-flops 73$_0$ through 73$_3$ are supplied to the control gate part 50 and the fault storage part 110, while the $\overline{Q}$-outputs of the flip-flops 73$_0$ through 73$_3$ are supplied to the bus buffer 75.

The flip-flops 73$_0$ through 73$_3$ store data indicative of the channels in the communication path which is fixed, and the AND gates 71$_0$ through 71$_3$ control the write-in and erasure of the data in the flip-flops 73$_0$ through 73$_3$.

Accordingly, in the end control part 70 shown in FIG. 5, communication end detecting circuit 700 can constantly detect the end of the communication in all of the channels. In other words, it is possible to detect the end of the communication in a channel which is not selected by the control gate part 50. For this reason, there is no delay corresponding to the communication end detection time constant when detecting the end of the communication immediately after the selected channel is changed.

The communication end detection time constant simply needs to be set appropriately for the case where the full duplex communication is chosen and the case where both the full duplex communication and the half duplex communication are to be enabled. Accordingly, there is no need to modify the hardware of the end control part 70 itself.

In FIG. 6, it is possible to use NAND gates in place of the NOR gates 702$_0$ through 702$_3$ and the NOR gates 704$_0$ through 704$_3$, so as to obtain logical products of the signals from the input and output channels. In this case, the end control part 70 discriminates that the communication is ended when a signal no longer exists in one of the two input channels included in the fixed communication path which is used for the communication.

The sequence control part 90 comprises a group of gates for producing control signals which are essential in controlling the node apparatus 10 and a circuit part for assigning priority to the end of the communication when there is a contention between the start of the communication and the end of the communication. The active detection time constant and an input signal detection time constant are determined in the sequence control part 90. There is no need to modify the hardware of the sequence control part 90 itself between the case where the full duplex communication is chosen and the case where both the full duplex communication and the half duplex communication are to be enabled.

The switching gate part 40, sequence control part 90, active signal producing part 100 and fault storage part 110 are further disclosed in the U.S. patent application Ser. No. 096,532, the disclosure of which is hereby incorporated by reference.

In the initial state where no communication is made between the input and output channels of the node apparatus 10, the gates of the switching gate part 40 are closed and signals can pass through the node apparatus 10 because the input port 20 and the output port 30 are coupled through the switching gate part 40. In this initial state, each input channel is coupled to all of the output channels except the output channel having a channel number corresponding thereto.

In the initial state, when the input signal is supplied to one of the input channels i0 through i3 (i0 through i7 in FIG. 2), the first input signal detecting part 60a detects which one of the input channels i0 through i3 receives the input signal first according to the first-come-first-output logic. As a result, only the first receiving input channel is coupled to those output channels other than the output channel having a channel number corresponding to that of the first receiving input channel. In other words, a broadcast communication is made by transferring the input signal which is received by the first receiving input channel of the input port 20 to all of the output channels of the output port 30 except for the output channel having the channel number corresponding to that of the first receiving input channel.

When the first input signal detecting part 60a detects the first receiving input channel, the sequence control part 90 is activated, and the sequence control part 90 starts a time supervision with the active detection time constant.

The active detection time constant is provided to receive active signals from input channels other than the first receiving input channel. Accordingly, even when the input signal (first sending signal) from the same source as the input signal received by the first receiving input channel is received by another input channel or when another input signal (another sending signal) from another source is received by another input channel, the input signals (sending signals) received by the input channels other than the first receiving input channel can be received.

The length of the active detection time constant is set to a time which is essentially equal to a sum of a propagation delay time for a return trip covering a maximum tolerable distance between the node apparatus 10 and another node apparatus 10 or the terminal device 14 and the duration of the active signal. Normally, a slight margin time is added to the length of the active detection time constant. The input signal (first sending signal) identical to that received by the first receiving input channel but obtained through a roundabout route are received by an input channel other than the first receiving input channel, the input signals (other sending signals) from other sources are received by the input channels other than the first receiving input channel and the active signal is received from the active signal producing part 100, all within the length of the active detection time constant. Hence, it is possible to detect the faulty or dormant channels.

The input channels which receive the input signals within a first supervision time defined by the active detection time constant are stored in the flip-flops $65_0$ through $65_3$ of the input signal detecting part 60b. When the first supervision time ends, the clock signal from the terminal WRITE2 of the sequence control part 90 drives the fault storage part 110. As a result, out of the input channels i0 through i3, one or more input channels which receive no input signal during the first supervision time are stored in the fault storage part 110 as being faulty or dormant input channels.

Next, the sequence control part 90 carries out a time supervision of the input signal detection time constant. The input signal detection time constant is provided to detect whether or not there is an input signal after the first supervision time defined by the active detection time constant. For example, the length of the input signal detection time constant is one bit in the case of the Manchester encoding, and is seven or more bits in the case of the encoding in which "0" is inserted into six consecutive "1"s in NRZI. Normally, a slight margin time is added to the one or seven bits to make it two times longer, and the length of the input signal detection time constant is set to two bits or fourteen or more bits. A second supervision time defined by the input signal detection time constant is thus provided to detect the input channels which receive the input signal (first sending signal) identical to that received by the first receiving input channel but obtained through a roundabout route, the input signals (other sending signals) from sources other than the source of the input signal (first sending signal) received by the first receiving input channel and the active signal, while distinguishing the input signals (sending signals) from the active signal.

One or more input channels which receive input signals within the second supervision time are stored in the flip-flops $65_0$ through $65_3$ of the input signal detecting part 60b. When the second supervision time ends, the input channel which receives no input signal within the second supervision time but thereafter receives an input signal is coupled to the output channel having the channel number corresponding to that of the first receiving input channel.

When the input signal ceases in any of the input channels included in the communication path and a third supervision time defined by the communication end detection time constant elapses, the end control part 70 instructs the sequence control part 90 to reset the first input signal detecting part 60a and the input signal detecting part 60b of the start control part 60 to the initial state.

The end of the communication may be detected from the input signal received by the first receiving input channel, so that a restore process is carried out when the input signal is no longer received by the first receiving input channel. Alternatively, it is possible to carry out the restore process when the input signal is no longer obtained at either one of the first receiving input channel or the output channels coupled to the first receiving input channel. It is possible to detect that an input signal is no longer obtained at a channel when the logic value of the input signal remains the same (for example, "0") for a certain time.

According to the present embodiment, the data on an input channel which receives a signal during the first supervision time but receives no signal during the second supervision time is stored in the input signal detecting part 60b even after the second supervision time, and only the input signal to such an input channel can be detected. It is possible to thereafter couple such an input channel to the output channel having the channel number corresponding to that of the first receiving input channel, and disconnect all of the other remaining input channels from the output channels.

When a certain input channel which receives a signal during the first supervision time but receives no signal during the second supervision time thereafter receives a first returning signal, the certain input channel is coupled to the output channel having the channel number corresponding to that of the first receiving input channel and the first receiving input channel is coupled to the output channel having a channel number corresponding to that of the certain input channel, so as to fix the coupling between the input nd output channels of the node apparatus 10. All of the input channels other than the certain input channel and the first receiving input channel are connected to the output channels other than the output channels having the channel numbers corresponding to those of the certain input channel and the first receiving input channel.

In the communication end detecting circuit 700 described before, the shift register 708$_i$ carries out a time supervision of the second communication end detection time constant until the first returning signal is received after the first sending signal is sent. The signal level of the start signal START changes to the high level when the node apparatus 10 enters the start sequence. Hence, when the switch 732 is open and the start signal START becomes high, the output signal level of the AND gate 718$_i$ becomes low while the AND gate 720$_i$ passes the $Q_H$-output of the shift register 708$_i$. Therefore, the time supervision of the first communication end detection time constant carried out by use of the shift register 706$_i$ is switched over to the time supervision of the second communication end detection time constant carried out by use of the shift register 708$_i$.

In any case, when a high-level signal is obtained from either one of the AND gates 718$_i$ and 720$_i$ which is not masked by the AND gate 726 to indicate the time-out of the shift register 706$_i$ or 708$_i$ in each channel i, that is, to indicate that the end of the communication is detected, this high-level signal is passed through the corresponding OR gate 724$_i$ and the OR gate 701 and is supplied to the sequence control part 90 as the end signal END. The sequence control part 90 controls the node apparatus 10 to the end sequence responsive to the end signal END, and sets the communication network ready for the new communication.

Next, a description will be given on the sequence of the communication made in a lattice communication network using four node apparatuses 10 described heretofore, by referring to FIGS. 7A through 7E. For convenience' sake, four node apparatuses 10A through 10D are coupled in the lattice form through transmission paths 12A, 12AB, 12AC, 12BD, 12CD and 12D each having four channels in FIGS. 7A through 7E. A terminal device 14A is coupled to the node apparatus 10A, and a terminal device 14D is coupled to the node apparatus 10D. In FIGS. 7A through 7E, a dot-pattern is provided on the transmitting side of each node apparatus or terminal device, a bold arrow indicates the flow of the sending signal, and an arrow with hatchings indicates the flow of the active signal and the returning signal.

When carrying out the full duplex communication in the present embodiment, the detection of the input signal and the control of the coupling between the input and output channels based on this detection are carried out in the following five basic steps.

Firstly, the lattice communication network is in the initial state, and in a first step shown in FIG. 7A, the terminal device 14A, for example, transmits a first sending signal in the form of the message packet. The sending signal includes a destination address indicative of the intended destination of the sending signal, and the intended destination included in the first sending signal is the terminal device 14D in this case. The first sending signal is supplied to the node apparatus 10A through the transmission path 12A. In the initial state, each input channel of the node apparatus 10A is coupled to all of the output channels thereof except the output channel having a channel number corresponding thereto.

When the node apparatus 10A detects that the first sending signal from the terminal device 14A is received first, the node apparatus 10A transfers the first sending signal to all of the output channels thereof except the output channel having the channel number corresponding to that of the first receiving input channel which is connected to the transmission path 12A. In other words, the first sending signal is broadcasted from the node apparatus 10A from the output channels connected to the transmission paths 12AB, 12AC and the like. In addition, the node apparatus 10A disconnects from the output channels thereof the input channels which are other than the first receiving input channel and are not in the fixed transmission path, and an active signal 230A is produced from the active signal producing part 100 and is outputted from the output channel of the node apparatus 10A having the channel number corresponding to that of the first receiving input channel which is connected to the transmission path 12A.

Next, in a second step shown in FIG. 7B, the node apparatus 10B receives the first sending signal through the transmission path 12AB, the node apparatus 10C receives the first sending signal through the transmission path 12AC, and the node apparatus 10D receives the first sending signal through the transmission paths 12BD and 12CD. The node apparatuses 10B, 10C and 10D broadcast the first sending signal similarly as in the case of the node apparatus 10A. In this case, the node apparatus 10C detects the input channel thereof connected to the transmission path 12AC as being the first receiving input channel. Hence, the first sending signal received through the transmission path 12AC is broadcasted through the transmission paths other than the transmission path 12AC, that is, through the transmission path 12CD and the like. In addition, the node apparatus 10C supplies an active signal 230C to an output channel thereof having a channel number corresponding to that of the first receiving input channel which is connected to the transmission path 12AC.

The node apparatus 10D receives the first sending signal from the transmission paths 12BD and 12CD, but detects the input channel thereof connected to the transmission path 12BD as being the first receiving input channel. Hence, the node apparatus 10D broadcasts only the first sending signal received through the transmission path 12BD to other transmission paths such as the transmission paths 12D and 12CD. The first sending signal received through the transmission path 12CD is not broadcasted from the node apparatus 10D. In addition, the node apparatus 10D supplies an active signal 230D to an output channel thereof having a channel number corresponding to that of the first receiving input channel which is connected to the transmission path 12BD.

In the node apparatuses 10C and 10D, when the difference between the arrival time of the first sending signal received by the first receiving input channel and the arrival time of the first sending signal received thereafter by another input channel is shorter than the time it takes for the control of the coupling of the input and output channels to be completed, a signal overlap occurs for an instant. However, this signal overlap occurs within the beginning portion of a preamble of the message packet and is negligible, and for this reason, no problems will be caused thereby. Thus, the first sending signal transmitted from the terminal device 14A and broadcasted from the node apparatus 10A is transmitted within the communication network without any signal overlap that would cause problems. Further, this negligible signal overlap is not accumulated at each node apparatus, since the signal overlap always occurs within the same beginning portion of the preamble of the message packet.

Each of the node apparatuses 10A through 10D supervise all of the input channels thereof within the first supervision time which starts from the detection of the first receiving input channel, so as to detect the input channel which receives no signal during the first supervision time. The data on the input channel which receives no signal during the first supervision time is stored in the input signal detecting part 60b. In the normal state where no fault exists in the node apparatus nor the node apparatuses and the terminal devices coupled thereto, the active signal or the first sending signal should arrive to the input channels during this first supervision time. When the active signal does not arrive to an input channel, this input channel is discriminated as being a faulty or dormant input channel, and the data on the faulty or dormant input channel is stored in the fault storage part 110. For example, in FIG. 7B, an input channel 234BX of the node apparatus 10B connected to a transmission path 12BX is a faulty or dormant input channel.

Each of the node apparatuses 10A through 10D supervise all of the input channels thereof within the second supervision time which starts after the lapse of the first supervision time. At this time, the active signal is already ended. The input channel which receives no input signal during the second supervision time may be coupled to all of the output channels other than the output channel having a channel number corresponding to that of this input channel. The input channel which receives no input signal during the second supervision time and is not identified as being a faulty or dormant input channel in the fault storage part 110 may be coupled to all of the output channels other than the output channel having a channel number corresponding to that of this input channel.

In a third step, the terminal devices coupled to the node apparatuses 10A through 10D receive the first sending signal originating from the sending terminal device 14A, and each terminal device returns the active signal as the returning signal upon receipt of the first sending signal and also collates its own address with the destination address included in the first sending signal. In this case, the terminal device 14D returns an active signal 232D as shown in FIG. 7B, and since the destination address included in the first sending signal coincides with the address of the terminal device 14D, the terminal device 14D transmits a first returning signal to the transmission path 12D. When the node apparatus 10D receives the first returning signal from the transmission path 12D as shown in FIG. 7C, the node apparatus 10D detects out of the input channels having channel numbers corresponding to those of the output channels from which the first sending signal was transmitted the input channel which receives no signal during the second supervision time but receives a signal after the end of the second supervision time. This detected input channel is coupled to the output channel having the channel number corresponding to that of the first receiving input channel.

In the case shown in FIG. 7C, when the node apparatus 10D receives the first returning signal from the transmission path 12D after a predetermined time elapses from the second supervision time, the node apparatus 10D connects the input channel which receives the first returning signal to the output channel which has a channel number corresponding to that of the first receiving input channel and is connected to the transmission path 12BD. Accordingly, the first returning signal from the transmission path 12D is outputted from the node apparatus 10D through the transmission path 12BD.

Then, after a terminal response supervision time in the case of the full duplex communication and after the third predetermined time defined by the communication end detection time constant in the case where both the full duplex communication and the half duplex communication are to be enabled, the node apparatus 10D couples all of the remaining input channels to all of the output channels other than the output channel having the channel number corresponding to that of the input channel which received the first returning signal. As a result, it is possible to prevent the node apparatus 10D from detecting the first sending signal from the transmission path 12CD shown in FIG. 7D. In other words, in this case, the transmission paths 12BD and 12D become coupled to each other.

In a fourth step, the node apparatuses 10B and 10A carry out control similar to that carried out by the node apparatus 10D. Hence, as shown in FIG. 7D, the first returning signal reaches the terminal device 14A through the communication path which was used to transfer the first sending signal. The first sending signal has a predetermined length, and the terminal devices such as the terminal device 14D transmit the first returning signal immediately after the destination address of the first sending signal is discriminated. Accordingly, the first sending signal and the first returning signal are transmitted simultaneously. For this reason, even when terminal devices other than the terminal devices 14A and 14D are connected to the communication network, these other terminal devices receive the overlapping first sending signal and the first returning signal and cannot discriminate the information content due to the interference caused by the overlap. Therefore, the secrecy of the transmission to the other terminal devices which is very important in the communication network is maintained. In addition, it is possible to carry out the multi-channel communication.

In a fifth step shown in FIG. 7E, when the node apparatus 10C detects that the first returning signal is not received through the transmission path 12CD and the like and the first sending signal is no longer received through the transmission path 12AC, the node apparatus 10C couples each of the input channels to all of the output channels other than the output channel having a channel number corresponding thereto. In other words, when the node apparatus 10C detects that no input signal is received during the second supervision time, that the first returning signal is not received even after the second supervision time and that the first sending signal is no longer received, the node apparatus 10C couples each of the input channels to all of the output channels other than the output channel having a channel number corresponding thereto. This means that the communication path is fixed by way of paths excluding the node apparatus 10C or that the communication is not completed and the terminal device 14A has discontinued to send the first sending signal. Accordingly, in all other cases, the arrival of the first returning signal within the terminal response supervision time starting from the detection of the first receiving input channel is guaranteed. When the sending signal does not reach the terminal device 14D for some reason and the terminal device 14A discontinues the transmission of the first sending signal because the first returning signal is not received, the node apparatus 10C couples each of the input channels to all of the output channels other than the output channel having a channel number corresponding thereto.

In the case where both the fll duplex communication and the half duplex communication are to be enabled, when the node apparatus 10C detects that the first sending signal is no longer received through the transmission path 12AC and the first returning signal is not received through the transmission path 12CD and the like even after the third supervision time defined by the communication end detection time constant elapses, the node apparatus 10C couples each of the input channels to all of the output channels other than the output channel having a channel number corresponding thereto. In other words, when the node apparatus 10C detects that there are input channels which do not receive the first sending signal and do not receive the first returning signal during the terminal response supervision time which starts from the end of the first sending signal, the node apparatus 10C couples each of these input channels to all of the output channels other than the output channel having the channel number corresponding thereto.

By controlling the coupling of the input and output channels in each of the node apparatuses 10 (10C in this case) not included in the communication path of the sending signal and the returning signal, it is possible to set and fix the communication path between the terminal device 14A and the terminal device 14D. Each of the node apparatuses 10 may carry out the control to set and fix a communication path through the paths which are unused by the communication path which is already fixed and is use.

Therefore, each node apparatus 10 detects the existence or non-existence of the input signal and carries out sequential control during the times defined by the active detection time constant, the input signal detection time constant, the terminal response supervision time and the communication end detection time constant. For example, in the case where the sending terminal device 14 from which the first sending signal originates is authorized to continue and end the full duplex communication, that is, normally when the interval of the sending signal is shorter than the time it takes to detect the end of the signal and the returning signal is transmitted intermittently, the node apparatus 10 detects that a signal is no longer received by the pair of input channels in the fixed communication path or detects that a signal is no longer received by either one of the pair of input channels in the fixed communication path. In this case, the node apparatus 10 couples all of the input channels to all of the output channels other than the output channels having channel numbers corresponding to those of the pair of input channels in the fixed communication path. In this state, the returning signal is not transmitted.

In the case of the half duplex communication and in the case of the full duplex communication where no priority needs to be set for the transmitting station and the receiving station, the node apparatus 10 detects that a signal is no longer received by neither channels of the pair of input channels in the fixed communication path, and couples all of the input channels to all of the output channels other than the output channels having channel numbers corresponding to those of the pair of input channels in the fixed communication path.

Figure 8:
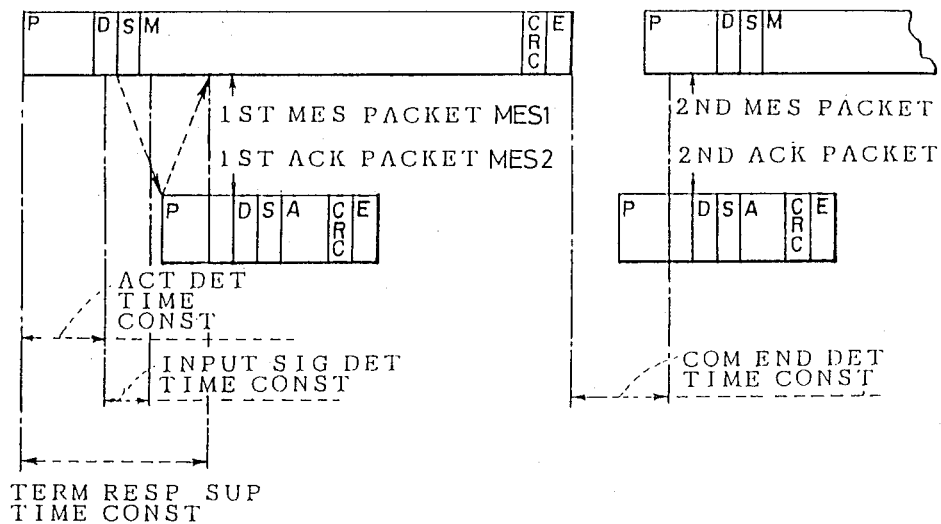
FIG. 8 is a diagram for explaining the flow of message packets when a returning signal (acknowledge packet) is returned normally in response to a sending signal in the full duplex communication.

FIG. 8 is a diagram for explaining the flow of the message packets when the returning signal (acknowledge packet) is returned normally in response to the sending signal in the full duplex communication. As shown in FIG. 8, a message packet MES1 which is transmitted as the first sending signal includes a preamble P and a destination address D before a message M. The preamble P continues for at least a predetermined time so as to enable synchronism with the terminal device 14. There are no other restrictions on the message packet MES1, but normally, the message packet MES1 also includes an origin address S indicating the address of the sending terminal device 14 from which the message packet MES1 originates. A check code area CRC for the cyclic redundancy code (CRC) and the like and a packet end code E follow the message M, and it is possible to provide a postamble (not shown) after the packet end code E for the purpose of maintaining the terminal device 14 is synchronism.

The terminal device 14 transmits the active signal immediately when the first sending signal, that is, the message packet MES1, is first received. When the terminal device 14 discriminates that destination address D of the received message packet MES1 coincides with its own address, the terminal device 14 transmits the first returning signal immediately after this discrimination is made in the case shown in FIG. 8 for the full duplex communication.

Figure 9:
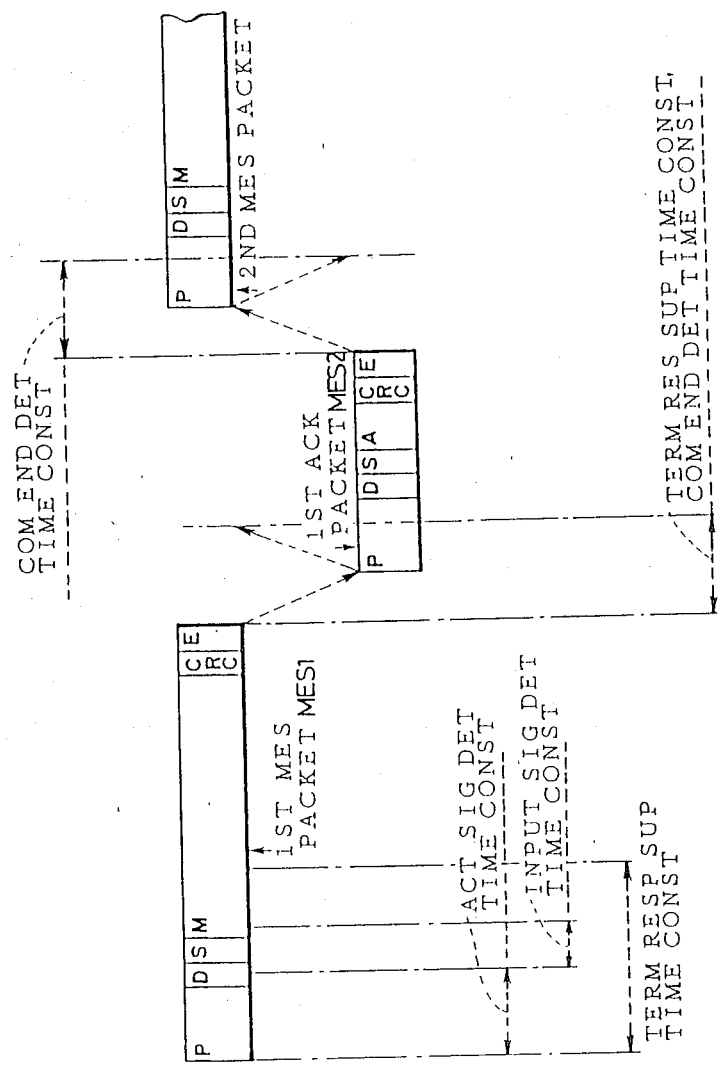
FIG. 9 is a diagram for explaining the flow of message packets when the returning signal (acknowledge packet) is returned normally in response to the sending signal in the half duplex communication.

FIG. 9 is a diagram for explaining the flow of the message packets when the first returning signal (acknowledge packet) is returned normally in response to the first sending signal in the half duplex communication. Hence, when the terminal device 14 discriminates that destination address D of the received message packet MES1 coincides with its own address, the terminal device 14 transmits the first returning signal immediately after the message packet MES1 ends in the case shown in FIG. 9 for the half duplex communication.

There are no restrictions on an acknowledge packet MES2 which is transmitted as the first returning signal, but normally, the first returning signal has a format similar to the message packet MES1 shown in FIG. 8 or 9. In other words, the first returning signal (acknowledge packet) comprises the preamble P, the destination address D, the origin address S of the destination terminal device 14 which received the first sending signal (message packet MES1), and an acknowledge code A or a not acknowledge code A. The message M may follow the acknowledge or not acknowledge code A. As described before, the transmission of the first returning signal to the sending terminal device 14 from which the first sending signal originates is preferentially guaranteed.

In the case of the full duplex communication, the terminal device 14 may discontinue the transmission when no input signal is received within the first supervision time from the time when the transmission of the first sending signal starts or when an input signal is received within the second supervision time following the first supervision time.

The sending terminal device 14 from which the first sending signal originates supervises the receipt of the first returning signal from the destination terminal device 14 during a terminal response supervision time (fourth predetermined time) having a predetermined length. When the receipt of the first returning signal is detected within the terminal response supervision time, it is discriminated that the destination terminal device 14 can respond normally and that the communication can be continued.

When no input signal is received by the sending terminal device 14 within the first supervision time defined by the active detection time constant from the time when the sending of the first sending signal starts, or when an input signal is received by the sending terminal device 14 within the second supervision time defined by the input signal detection time constant, the communication is discontinued. In the former case, there is a fault in the transmission path 12 or node apparatus 10 which is connected to the sending terminal device 14, and it is necessary to restore the faulty transmission path 12 or node apparatus 10. On the other hand, in the latter case, there is a collision between the sending terminal device 14 and the node apparatus 10 which is connected to the sending terminal device 14, and the sending terminal device 14 must re-transmit the first sending signal.

Figure 10:
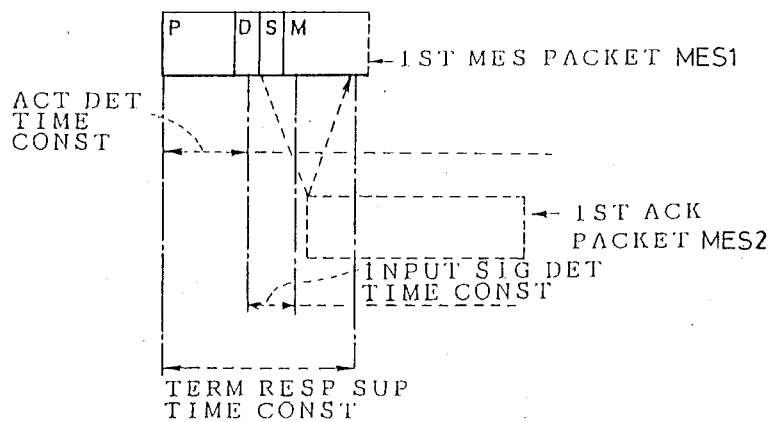
FIG. 10 is a diagram for explaining the flow of message packets when the returning signal (acknowledge packet) is not returned normally in response to the sending signal in the full duplex communication.

When no receipt of the first returning signal from the destination terminal device 14 is detected during the terminal response supervision time, it is discriminated that the first sending signal did not reach the destination terminal device 14 or that the destination terminal device 14 is unable to respond normally, and the communication is discontinued as shown in FIG. 10. FIG. 10 is a diagram for explaining the flow of the message packets when the first returning signal (acknowledge packet) is not returned normally in response to the first sending signal in the full duplex communication. The sending terminal device 14 from which the first sending signal originates may re-transmit the first sending signal, and the control in this case may be similar to that carried out in the communication employing the CSMA method. Accordingly, it is possible to fix a communication path between the sending and destination terminal devices 14, and carry out the communication by the exclusive use of the fixed communication path.

In the case of the full duplex communication, the terminal response supervision time starts from the time when the sending terminal device 14 begins transmission of the first sending signal. The length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the first returning signal from the time when the first sending signal is received. Normally, a slight margin time is added to the length of the terminal response supervision time.

In the case where both the full duplex communication and the half duplex communication are to be enabled, the terminal response supervision time starts from the time when the transmission of the first sending signal from the sending terminal device 14 ends. In this case, the length of the terminal response supervision time is set essentially equal to a sum of the propagation delay time for a return trip covering a maximum tolerable distance between the node apparatus 10 and another node apparatus 10 or the terminal device 14 and the time it takes for the destination terminal device 14 to begin transmission of the first returning signal from the time when the receipt of the first sending signal ends. Normally, a slight margin time is also added to the length of this terminal response supervision time. The receipt of an input signal by the node apparatus 10 within the terminal response supervision time is guaranteed.

The destination terminal device 14 may be designed to report the receipt of the first sending signal after the first sending signal is correctly received. In other words, this may be realized by sending the first returning signal immediately after the receipt of the first sending signal ends. The acknowledge or not acknowledge code is included in such first returning signal.

When the terminal device 14 transmits another sending signal or a returning signal in succession to the first sending signal or the first returning signal, that is, when the terminal device 14 transmits a plurality of message packets in succession, the intervals of the message packets should not exceed the third predetermined time defined by the communication end detection time constant described before. In other words, in order to continue the communication by exclusively using the fixed communication path, a message packet should be sent within the third predetermined time after an end of a previous message packet.

In the case of the full duplex communication, a dummy signal such as the postamble is inserted between two successive message packets (for example, between an Nth message packet and a (N+1)th message packet) so that the third predetermined time will not be exceeded. On the other hand, in the case of the half duplex communication, the destination terminal device 14 transmits an Nth returning signal within the third predetermined time after the receipt of an Nth sending signal ends and preferably immediately after the receipt of the Nth sending signal ends, while the sending terminal device 14 from which the Nth sending signal originates sends a (N+1)th sending signal within the third predetermined time after the receipt of the Nth returning signal ends and preferably immediately after the receipt of the Nth returning signal ends. Similarly, even when the data is transmitted in a form other than message packets such as when transmitting audio or video information, the length of the no-signal state should not exceed the third predetermined time.

The communication can be ended by simply stopping the transmission of the signal from the terminal device 14.

According to the present embodiment, the degree of freedom with respect to the following points is high provided that the detection of the input signal and the control of the coupling of the input and output channels based on this detection are carried out in the five basic steps described before.

Firstly, there is not limit to the maximum and minimum lengths of the message packet, and it is not essential that the data take the form of the message packet.

Secondly, there is no limit to the number of times the sending signal and the returning signal may be repeated, and the fixed communication path may be used exclusively therefor.

Thirdly, it is possible to freely determine the data transmission rate between the sending and destination terminal devices provided that the data transmission rate is less than the maximum data transmission rate determined by the hardware constituting the communication network.

Fourthly, it is possible to freely select either one of the full duplex communication and the half duplex communication, and it is also possible to enable both the full duplex communication and the half duplex communication within the communication network.

In summary, according to the present embodiment, the node apparatus 10 enables a multi-channel communication in which the sending signal and the returning signal can be transferred simultaneously. The faulty node apparatus or line may be avoided when forming the link according to the first-come-first-output logic, thereby maintaining a high data survivability within the lattice communication network.

Furthermore, as for the communication made after the communication path is fixed, the node apparatus 10 releases the communication path when no input or output signal exists for a time determined by the first communication end detection time constant. On the other hand, as for the communication made to fix the communication path, the node apparatus 10 enters the end sequence when no input or output signal exists for a time determined by the second communication end detection time constant, so as to initialize the node apparatus 10 and set the communication network ready for the next communication. Therefore, it is possible to initialize the node apparatuses 10 in the communication network before the next message requesting the next communication is sent, and the timing difference between the initializing of the node apparatus 10 in the fixed communication path and the initializing of the node apparatus 10 not included in the fixed communication path is minimized. As a result, it is possible to considerably reduce an erroneous operation from being carried out by a node apparatus 10 which is not yet initialized in a state where all of the node apparatuses 10 in the fixed communication path are initialized.

Of course, the node apparatus of the present invention is applicable not only to an OSI of a local area network, but is also effectively applicable to a public line network and network control.

Further, the present invention is not limited to these embodiments, but various variations and modifications may be made without departing from the scope of the present invention.

What is claimed is:

1. A node apparatus for a communication network having a multi-conjunction architecture, said communication network having a plurality of transmission paths each coupling one node apparatus to another node apparatus or a terminal device, said node apparatus comprising:
    an input port comprising a plurality of input channels connected to the transmission paths;
    an output port comprising a plurality of output channels connected to the transmission paths;
    a switching gate part for coupling said input and output channels of said input and output ports; and
    control means for controlling said switching gate part to maintain said input and output channels in an initial state so that each input channel other than input channels included in the fixed communication path being coupled to all of said output channels other than an output channel having a corresponding channel number;
    control means comprising first and second control parts for controlling said switching gate part to selectively couple said input and output channels, said first control part being coupled to said input port and detecting a first receiving input channel which receives a sending signal first out of said input channels, said second control part being coupled to said input and output ports and controlling said switching gate part based on a time supervision of a signal presence at said input and output channels of said input and output ports,
    said first control part controlling said switching gate part responsive to the detection of said first receiving input channel so that all of said input channels other than said first receiving input channel are disconnected from said output channels, thereby transferring the sending signal received by said first receiving input channel to all of said output channels other than an output channel having a channel number corresponding to that of said first receiving input channel,
    said first control part detecting a predetermined input channel which receives a returning signal out of said input channels other than said first receiving input channel, said first control part controlling said switching gate part responsive to the detection of said predetermined input channel so that said predetermined input channel is connected to the output channel having a channel number corresponding to that of said first receiving input channel and said first receiving input channel is connected to an output channel having a channel number corresponding to that of said predetermined input channel, thereby forming a fixed communication path between said input and output ports,
    said second control part controlling said switching gate part to disconnect and release the fixed communication path when no signal is present at said input and output channels of said input and output ports for a first time period after the communication path is fixed,
    said second control part controlling said switching gate part to set said node apparatus to an initial state when no signal is present at said input and output channels of said input and output ports for a second time period before the communication path is fixed.

2. A node apparatus as claimed in claim 1 in which said first time period is longer than said second time period.

3. A node apparatus as claimed in claim 1 in which said second control part comprises a communication end detecting part for detecting an end of a communication by supervising the signal presence at all of said input and output channels of said input and output ports, and a connection storage part for storing input and output channels included in the fixed communication path.

4. A node apparatus as claimed in claim 3 in which said communication end detecting part detects the end of the communication when signals cease in each input channel included in the fixed communication path.

5. A node apparatus as claimed in claim 3 in which said communication end detecting part comprises a first time-out circuit for timing said first time period after the communication path is fixed and a second time-out circuit for timing said second time period before the communication path is fixed.

6. A node apparatus as claimed in claim 5 in which said control means further comprises means for generating a start signal when fixing a communication path, said second control part making the time supervision by selectively using said second time-out circuit in a presence of said start signal and said first time-out circuit in a non-presence of said start signal.

7. A node apparatus as claimed in claim 5 in which said communication end detecting part further comprises adjusting means for adjusting values of said first and second time periods timed in said first and second time-out circuits, said first and second time periods being independently adjustable for each channel of said input and output ports.

8. A node apparatus as claimed in claim 5 in which said first time period is longer than said second time period.

9. A node apparatus as claimed in claim 1 in which said first time period is set to a time which is essentially equal to a sum of a propagation delay time for a return trip covering a maximum tolerable distance between said node apparatus and another node apparatus or the terminal device in the communication network, a time it takes for the terminal device to start sending a returning signal after a receipt of a sending signal ends or vice versa, and a time it takes to detect a true end of the communication from an information content made up of successive "0"s or "1"s, and said second time period is set to a time which is essentially equal to a sum of a propagation delay time for a return trip covering the maximum tolerable distance between said node apparatus and another node apparatus or the terminal device in the communication network, a time it takes for the terminal device to start sending a returning signal after a receipt of a sending signal ends, and a time it takes to detect a true end of the communication from an information content made up of successive "0"s or "1"s.

* * * * *